US012638220B2

(12) United States Patent
Finlayson et al.

(10) Patent No.: US 12,638,220 B2
(45) Date of Patent: May 26, 2026

(54) GAS ENERGIZED SEAL FOR GIFFORD-MCMAHON EXPANDER

(71) Applicant: Sumitomo (SHI) Cryogenics of America, Inc., Allentown, PA (US)

(72) Inventors: Eric F. Finlayson, Allentown, PA (US); Qian Bao, Allentown, PA (US); Mingyao Xu, Allentown, PA (US); Ralph C. Longsworth, Mount Desert, ME (US)

(73) Assignee: SUMITOMO (SHI) CRYOGENIC OF AMERICA, INC., Allentown, PA (US)

( * ) Notice: Subject to any disclaimer, the term of this patent is extended or adjusted under 35 U.S.C. 154(b) by 671 days.

(21) Appl. No.: 17/969,138

(22) Filed: Oct. 19, 2022

(65) Prior Publication Data

US 2023/0129966 A1 Apr. 27, 2023

Related U.S. Application Data

(60) Provisional application No. 63/271,818, filed on Oct. 26, 2021.

(51) Int. Cl.
F25B 9/06 (2006.01)
F16J 9/20 (2006.01)
(Continued)

(52) U.S. Cl.
CPC ................... F25B 9/06 (2013.01); F16J 9/20 (2013.01); F16J 9/26 (2013.01); F25B 9/145 (2013.01); F25B 2309/1414 (2013.01)

(58) Field of Classification Search
None
See application file for complete search history.

(56) References Cited

U.S. PATENT DOCUMENTS

| | | | |
|---|---|---|---|
| 3,045,436 A | 7/1962 | Gifford et al. | |
| 3,205,668 A | 9/1965 | Gifford | |
| | (Continued) | | |

FOREIGN PATENT DOCUMENTS

| | | | | |
|---|---|---|---|---|
| AT | 514794 A1 | * | 3/2015 | ............ G01M 15/04 |
| CN | 108507215 A | * | 9/2018 | ........... F16K 27/045 |
| | (Continued) | | | |

OTHER PUBLICATIONS

JP2016033418A English Machine Translation (Year: 2016).*
(Continued)

*Primary Examiner* — Jenna M Maroney
(74) *Attorney, Agent, or Firm* — KATTEN MUCHIN ROSENMAN LLP

(57) ABSTRACT

A Gifford McMahon (GM) cryogenic expander provides a structure configured to increase the life of the displacer and stem seals of the reciprocating displacer. The seal includes a ring that is relatively long and thin and uses the pressure difference across the seal, acting behind the ring, as the primary force to bring the ring into contact with the cylinder and stem walls. The pressure difference across the seal ring pushes the ring to one end of the groove, and the friction force pushes the ring in the same direction while it is moving. The sealing force is distributed over a larger area compared with a conventional backed "O" ring thus reducing the wear rate and increasing the seal life.

13 Claims, 5 Drawing Sheets

(51) Int. Cl.
*F16J 9/26* (2006.01)
*F25B 9/14* (2006.01)

(56) References Cited

U.S. PATENT DOCUMENTS

| | | | | |
|---|---|---|---|---|
| 3,364,675 A | 1/1968 | Dorer | | |
| 3,373,999 A | 3/1968 | Jepsen | | |
| 5,361,588 A | 11/1994 | Asami et al. | | |
| 5,447,034 A | 9/1995 | Kuriyama et al. | | |
| 6,256,997 B1 * | 7/2001 | Longsworth | F25B 9/14 | 60/520 |
| 6,532,748 B1 * | 3/2003 | Yuan | F25B 9/145 | 165/4 |
| 9,845,765 B2 * | 12/2017 | Donahue | F16J 9/08 | |
| 11,774,147 B2 * | 10/2023 | Xu | F25B 9/14 | 62/6 |
| 2010/0133757 A1 * | 6/2010 | Maeda | F16J 15/3244 | 277/436 |
| 2011/0278799 A1 * | 11/2011 | Seki | F16J 15/3272 | 277/408 |
| 2015/0168026 A1 * | 6/2015 | Lei | F25B 9/10 | 62/6 |
| 2015/0176867 A1 * | 6/2015 | Longsworth | F25B 9/10 | 62/6 |
| 2015/0204204 A1 | 7/2015 | Seki et al. | | |
| 2018/0023849 A1 | 1/2018 | Longsworth | | |
| 2019/0011170 A1 * | 1/2019 | Morie | F25B 9/10 | |
| 2019/0277542 A1 * | 9/2019 | Xu | F25B 9/14 | |
| 2022/0065499 A1 * | 3/2022 | Longsworth | F25B 9/10 | |

FOREIGN PATENT DOCUMENTS

| | | | | | |
|---|---|---|---|---|---|
| CN | 112413176 B | * | 10/2023 | | F16K 11/074 |
| EP | 3104100 B1 | * | 7/2019 | | F25B 9/00 |
| JP | S53-83949 U | | 7/1978 | | |
| JP | S57-002774 Y | | 1/1982 | | |
| JP | 2-236060 A | | 9/1990 | | |
| JP | H03129258 A | | 6/1991 | | |
| JP | H0544645 A | | 2/1993 | | |
| JP | 07-269709 A | | 10/1995 | | |
| JP | 3895552 B2 | | 3/2007 | | |
| JP | 2016-033418 A | | 3/2016 | | |
| JP | 2018-036042 A | | 3/2018 | | |
| JP | 2018091601 A | * | 6/2018 | | F04B 9/1372 |
| JP | 2019128115 A | * | 8/2019 | | F25B 9/145 |
| KR | 10-2020-0128758 A | | 11/2020 | | |
| WO | WO-2018163728 A1 | * | 9/2018 | | F25B 9/145 |
| WO | WO-2020049936 A1 | * | 3/2020 | | F25B 9/14 |

OTHER PUBLICATIONS

International Search Report and Written Opinion of the International Searching Authority dated Feb. 14, 2023, from the corresponding International Application No. PCT/US2022/046497.

Extended European search report dated Jul. 18, 2025, from European Patent Application No. 22887932.6, 6 sheets.

Notice of Reasons for Refusal issued Mar. 3, 2026, for Japanese Patent Application No. 2024-525375, 15 sheets including English translation.

* cited by examiner

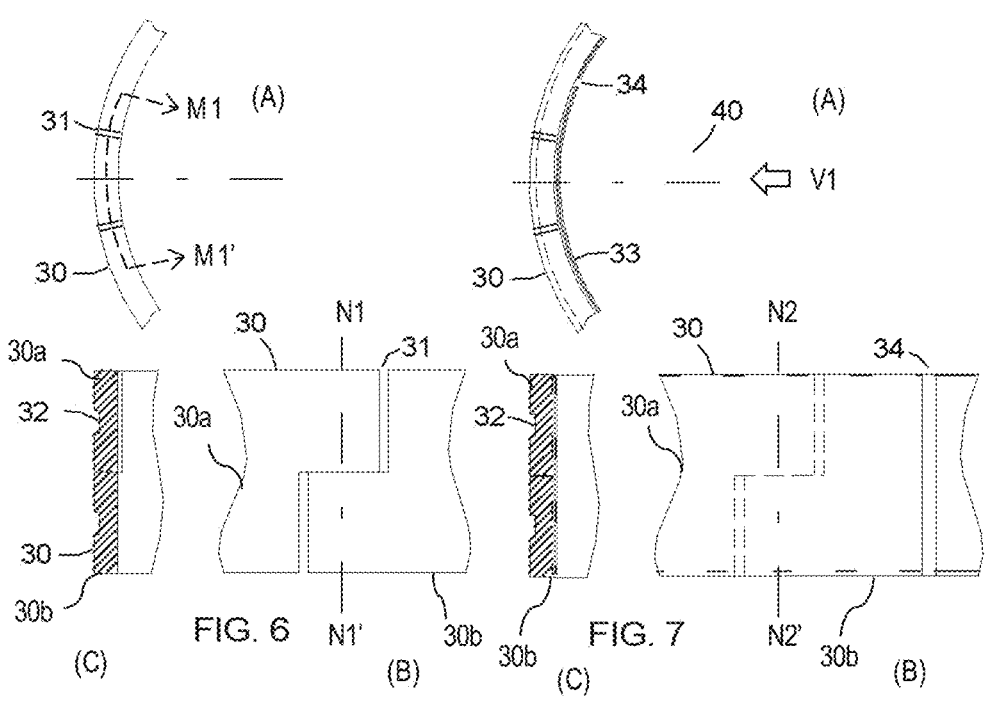
FIG. 6
FIG. 7
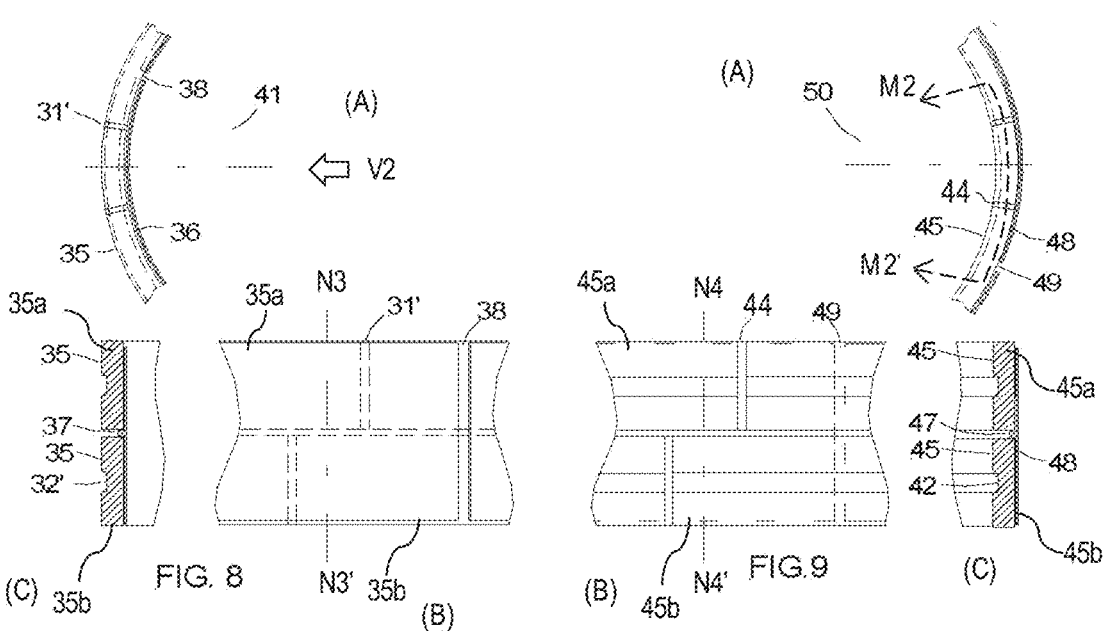
FIG. 8
FIG. 9

GAS ENERGIZED SEAL FOR GIFFORD-MCMAHON EXPANDER

CROSS REFERENCE TO RELATED APPLICATIONS

This application claims the priority of U.S. Provisional Application Ser. No. 63/271,818, filed on Oct. 26, 2021, which is hereby incorporated herein by reference in its entirety.

FIELD OF INVENTION

This invention relates to the seal for the reciprocating displacer and drive stem of a Gifford-McMahon (GM) cryogenic expander.

BACKGROUND

U.S. Pat. No. 3,045,436 ("the '436 patent"), by W. E. Gifford and H. O. McMahon describes the GM cycle. The systems described herein operate on the GM cycle and in general have input powers in the range of 5 to 15 kW, but larger and smaller systems can fall within the scope of this invention. GM cycle refrigerators use oil lubricated compressors designed for air conditioning applications to supply gas (helium) to reciprocating cryogenic expanders. A GM expander cycles gas to the cold expansion space through inlet and outlet valves at room temperature and a regenerator. The displacer in the expander is either driven mechanically or pneumatically.

U.S. Pat. No. 3,205,668 ("the '668 patent") by Gifford describes a GM expander that has a stem attached to the warm end of the displacer which drives the displacer up and down by cycling the pressure above the drive stem out of phase with the pressure to the expansion space by means of a rotary valve. A cycle may assume to start with the displacer down (cold displaced volume minimal) and at low pressure, Pl, and the pressure above the stem high, Ph. Pressure to the displacer is switched to high pressure followed after a brief delay of the pressure to the drive stem being switched to low pressure. This causes the displacer to move up drawing high pressure gas through the regenerator into the cold displaced volume. The high pressure valve to the displacer is closed before the displacer reaches the top and there is a partial expansion of the gas as it reaches the top. The low pressure valve to the displacer is then opened and the expanding gas gets cold. The pressure above the drive stem is then switched to high pressure and pushes the displacer down, pushing the cold low pressure gas through the cold end heat exchanger and back out through the regenerator, completing the cycle. The pressure difference across the displacer seal switches between high and low pressure while the displacer is essentially stationary at the ends of the stroke, then drops to a smaller pressure difference due to the pressure drop through the regenerator as the displacer moves between the warm and cold ends of the cylinder.

Cryogenic expanders are usually operated with their cold ends down and the warm end at room temperature, about 10° C. to 40° C. Up and top are towards the warm end and down and bottom are towards the cold end in axial or vertical directions. Inside and outside are radial or horizontal directions.

An example of a mechanically driven displacer is described in U.S. Pat. No. 5,361,588 ("the '588 patent") by Asami. This GM expander has a Scotch Yoke driven displacer and a rotary valve. The Scotch Yoke drive fixes the position of the displacer as the motor rotates regardless of the pressure. Refrigeration is optimized when the timing of gas flowing in and out of the displacer as it reciprocates is the same as described above. Pressure in the housing is typically at low pressure but may be at high pressure. The pressure difference across the seal on the drive stem is thus small in one direction due to pressure drop through the valve and large, Ph-Pl, in the other. The displacers in GM expanders have a means of preventing gas from flowing through the gap between the outside of the displacer and the inside of the cylinder. This usually takes the form of a seal in a groove at the warm end of the displacer. Japanese patent 3895552 ("the '552 patent") shows in FIG. 1a seal 5 in an upper groove and a wear ring 6 in a groove below it. The inner surface of the wear ring is in contact with the side surface of the lower groove and the clearance between it and the cylinder is small, so it keeps the displacer centered even when the expander is oriented horizontally. Experiments were performed without seal 5 in place; with a displacer that has a diameter of 100 mm and a wear ring with a gap of 1.5 mm which is cut vertically. It was found that the leakage through the cut resulted in a small loss in refrigeration near 80K but it was recognized that this wear ring would have a lower wear rate than seal 5 because it did not have backing "O" ring 5a applying pressure to the back side of seal ring 5b. The problem with using the wear ring as a seal is that the leakage would increase as the wear ring wears and the gap between the outside diameter (OD) of the wear ring and the inside diameter (ID) of the cylinder increases. If this increase in leakage can be kept small then the tradeoff of a small loss of cooling for a longer period between maintenance is valuable.

It was recognized that if the higher pressure across the seal could be trapped behind the wear ring then the ring could press against the cylinder wall and act as a seal as it moved; except for the cut which can be small. This requires that there be a small gap behind the ring (between the ring and the side of the groove) and a means to let the higher pressure gas flow into that gap. Gas at a higher pressure can flow through a cut in the ring and/or through a gap at the end of the ring. This gap is created by making the length of the ring shorter than the axial length of the groove. When the pressure in the displacer switches between high and low, the ring is pushed to the lower pressure end of the groove; then is held there by the pressure drop through the regenerator and the friction of the seal sliding along the cylinder as the displacer moves up or down. The force due to the pressure difference across the seal is in the same direction as the force due to sliding friction while the displacer is moving. This is true for a similar seal on the drive stem, of a pneumatically actuated displacer, if it is fixed in the housing, and the ID of the ring seals against the OD of the drive stem. There is an advantage in having two seals on the drive shaft but only one on the displacer.

It is noted that for a piston that is compressing a gas it is preferred to have the seal on the piston where the pressure force and the friction force are in the same direction.

There are numerous patents and numerous seals of different designs on the market that address different problems in different applications. U.S. Pat. No. 3,373,999 ("the '999 patent") by Jepsen in particular contains some of the features of this application. The patent describes two gas energized seals, shown in FIG. 3, for a compressor used to compress gases used in cryogenic applications. e.g. N2 and He, in the range of 0.1 MPa to 100 MPa. The application requires that the gas must be kept clean and dry. FIGS. 1 and 2 show the radial pressure distribution and the net pressure difference across the two rings as the piston is compressing gas. The top ring (closest to the compression chamber) has much less differential pressure across it than the lower ring. The top ring, shown in FIG. 4, has a crescent cut straight through the ring from top to bottom and expands radially to form a seal with a small pressure difference across it. The lower ring, shown in FIG. 5, is uncut and expands radially at a higher pressure difference. Both rings have a smaller OD than the ID of the cylinder when there is no pressure difference across them, and the axial pressure difference and the friction force of the ring sliding along the cylinder are in the same direction. FIG. 3 shows a gap above the ring that lets high pressure gas flow into a gap behind the ring. Japanese patent JP2-236060 shows in FIG. 3 a compressor piston ring similar to the top ring of the Jepsen patent except the cut is on an angle that is about 30° above a horizontal plane.

SUMMARY

The object of this invention is to increase the life of the displacer and stem seals of the reciprocating displacer of a Gifford McMahon (GM) cryogenic expander. The seal comprises a ring that is relatively long and thin and uses the pressure difference across the seal, acting behind the ring, as the primary force to bring the ring into contact with the cylinder and the stem walls. The pressure difference across the seal ring pushes the ring to one end of the groove, and the friction force pushes the ring in the same direction while it is moving. The sealing force is distributed over a larger area compared with a conventional backed "O" ring thus reducing the wear rate and increasing the seal life.

These advantages and others are achieved by a Gifford-McMahon (GM) expander with improved seal characteristics. The GM expander comprises a displacer having a groove on the outer circumference (Rd), a cylinder having an inner surface (Rc), a seal ring placed in said groove, a cold displaced volume in the cylinder at a lower end of said displacer, a warm displaced volume in the cylinder at an upper end of said displacer, and a regenerator between said cold and warm displaced volumes. The groove is defined by an upper surface, a lower surface and a side surface connecting said upper and lower surfaces. The displacer axially reciprocates in the cylinder. The seal ring has an axial length along an axial direction of the displacer. The seal ring has an outer surface (Rro) adjacent to said cylinder and an inner surface (Rri) adjacent to said side surface of the groove, and a first radial gap (W1) is formed between said inner surface of the seal ring and said side surface of the groove and a second axial gap (W2) is formed by a difference between the axial length of said seal ring (Lr) and a distance between said upper and lower surfaces (Lg) of the groove.

These advantages and others are also achieved by a pneumatically actuated GM expander supplied with gas from a compressor at a high pressure and returning gas to the compressor at a low pressure. The GM expander comprises a displacer having a drive stem at the warm end of the displacer that reciprocates in a cylinder between a warm end and a cold end of the cylinder creating a warm displaced volume and a cold displaced volume separated by a regenerator, a housing extending above the warm end of the cylinder and having a drive stem volume, and a seal ring placed in said groove, wherein the groove and seal ring are configured to have a radial gap (W1') between an inside radius (Rg') of the groove and an outside radius (Rro') of the seal ring and an axial gap (W2') formed by the difference between axial lengths of the groove and the seal ring. The drive stem reciprocates in the drive stem volume and the housing has a groove on a wall of the drive stem volume

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 6(A)-6(C) are section drawings of a seal ring that shows a step cut.

FIGS. 7(A)-7(C) show a composite ring that has a thin ring inside an outer ring. Both rings have cuts in them.

FIGS. 8(A)-8(C) show a composite ring that has a thin ring inside an outer ring. The inner ring has a rib on the outside that separates and centers the two outer rings. All of the rings have cuts in them.

FIGS. 9(A)-9(C) show a composite ring that is designed to fit in a fixed groove in the housing to seal the outside of the drive stem. It is analogous to the ring shown in FIGS. 8(A)-8(C) except that the ring seals on the inside and the thin backing ring is on the outside.

DETAILED DESCRIPTION

Figure 1:
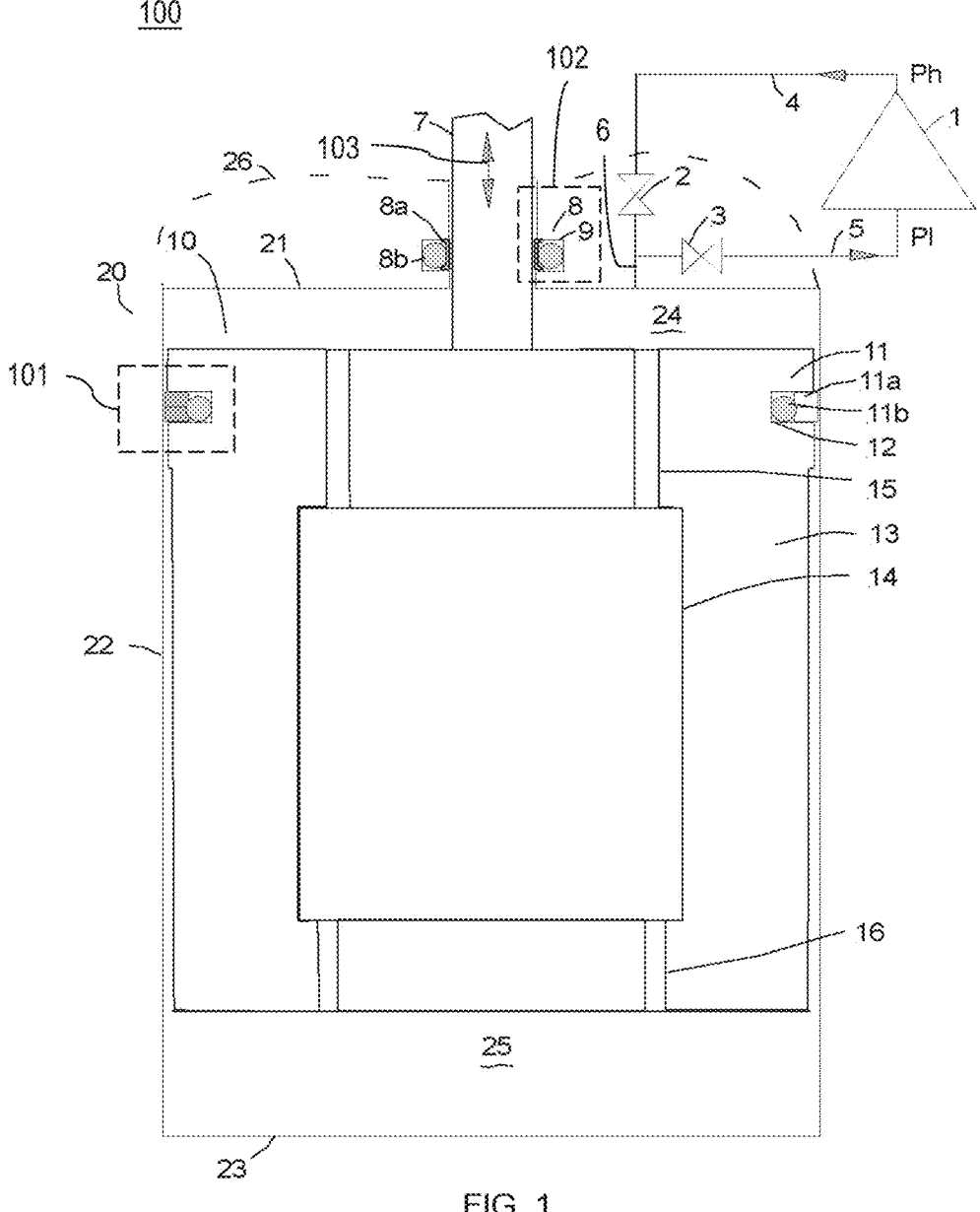
FIG. 1 is a schematic of the basic components of a GM cryogenic refrigerator showing seals on the displacer and drive stem.

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Parts that are the same or similar in the drawings have the same numbers and descriptions are usually not repeated. The same numbers are used for the same components in the drawings and subscripts are used to distinguish the equivalent part with a different configuration.

With reference to FIG. 1, shown is a schematic of the basic components of a GM cryogenic refrigerator 100. The main components are compressor 1, displacer assembly 10, and cylinder assembly 20. Displacer assembly 10 is comprised of drive stem 7, displacer seal 11 in groove 12, displacer body 13, regenerator 14, and ports 15 and 16 that connect warm displaced volume 24 with cold displaced volume 25, through regenerator 14. Cylinder assembly 20 is comprised of warm end 21, cylinder 22, cold end 23; warm end 21 being part of housing 26 containing stem seal 8 in groove 9, and valves 2 and 3 that switch gas flow between high and low pressure to warm displaced volume 24 through line 6. High pressure lines 4 and low pressure line 5 carry gas to and from compressor 1. The function of displacer seal 11 is to prevent gas from flowing through the gap between displacer body 13 and cylinder 22 that would bypass regenerator 14. Similarly stem seal 8 prevents gas from leaking between the space above it and warm displaced volume 24. In expanders with Scotch Yoke drives the stem seal is often a clearance type seal.

Conventionally, displacer seal 11 may have two rings with cuts, 11a, typically step cuts or crescent cuts that do not overlap. They have a close fit between the top and bottom of groove 12, and are pressed into contact with the cylinder by "O" ring 11b that prevents gas from leaking behind the rings. This design has a relatively large amount of material that can wear away but the sealing force from the "O" ring decreases as the seal wears and the gap where the rings are cut increases; eventually the seal starts to leak. Stem seal 8 is shown as a commercially available cap seal 8a; a relatively thin seal with lips on the sides, and an "O" ring 8b behind it that brings it into contact with stem 7. These seals are usually made with a Teflon based material that has a low coefficient of friction.

Figure 2:
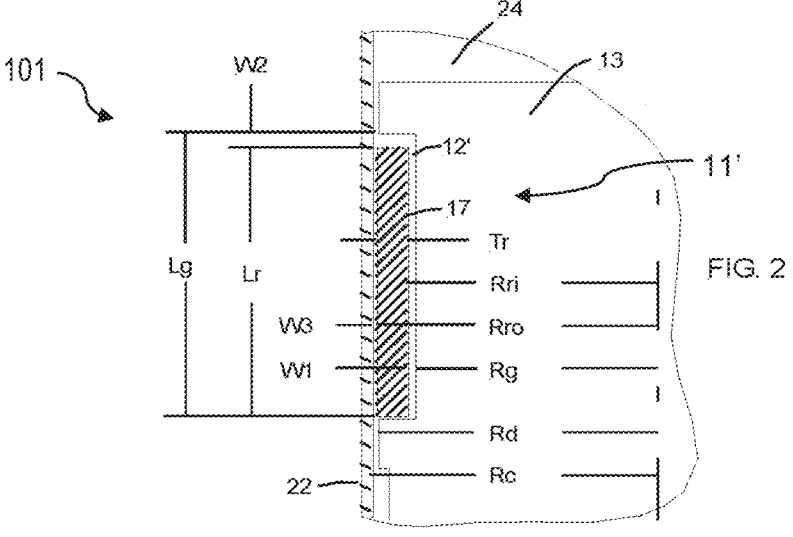
FIG. 2 is a cross section view of the area of the displacer seal of the disclosed invention at the warm end of the displacer.

With reference to FIG. 2, shown is a cross sectional view of the area 101 showing the displacer seal 11' of the disclosed invention at the warm end of the displacer body 13. The displacer seal 11' shown in FIG. 2 may be used for the GM cryogenic refrigerator 100 to improve sealing characteristics of the displacer body 13. Seal ring 17 is formed in groove 12' between the inside wall of cylinder 22 and side surface of groove 12'. The inside wall of cylinder 22 has a radius Rc, and the side surface of groove 12' has a radius Rg and a length Lg between upper end (top) and lower end (bottom) surfaces. Seal ring 17 has an outer radius Rro, an inner radius Rri, a length Lr, and a thickness Tr. The portions of the displacer above and below groove 12' has a radius Rd. The gap between the inside of seal ring 17 and the side surface of groove 12' has a width W1 and is referred to as gap W1. Because the length Lr of seal ring 17 is smaller than the length Lg of the side surface of groove 12', gap W2 is formed between the groove 12' and the seal ring 17 in an axial direction 103 of the displacer body 13. Gap W2 is wider than gap W1 so that flow into gap W1 is not too restricted. Gap W2 may be alternately formed at the top or bottom portion of groove 12' as the gas pressure changes and the displacer reciprocates. Flow rate through gap W2 is proportional to W2/Tr and flow rate in and out of the gap W1 is approximately proportional to W1/Lr. It is preferred that a ratio of (W2/Tr)/(W1/Lr) be greater than two (2). The gap between the outside of seal ring 17 and the inside of cylinder 22 has a width W3 and is referred to as gap W3. The flow rate in and out of gap W3 is approximately proportional to W3/Lr. It is preferred that a ratio of (W2/Tr)/(W3/Lr) be greater than four (4).

Displacer seal 11' is shown sealing on the outside of the seal while stem seal 8' is shown sealing on the inside of the seal. Conventional seals that are backed by "O" rings are available as either internal or external seals. The gas energized seals of the disclosed invention however may require that the seal ring be forced against the side of the groove opposite gap W2 so that the higher pressure gas acting across the seal is behind the seal and that the friction force on the seal ring holds it there while it is moving. The gas pressure force and the friction force are in the same direction for a GM expander if the displacer seal is on the displacer.

This is also true for the seal on the drive stem of a pneumatically driven expander if the seal is in the housing.

Figure 3:
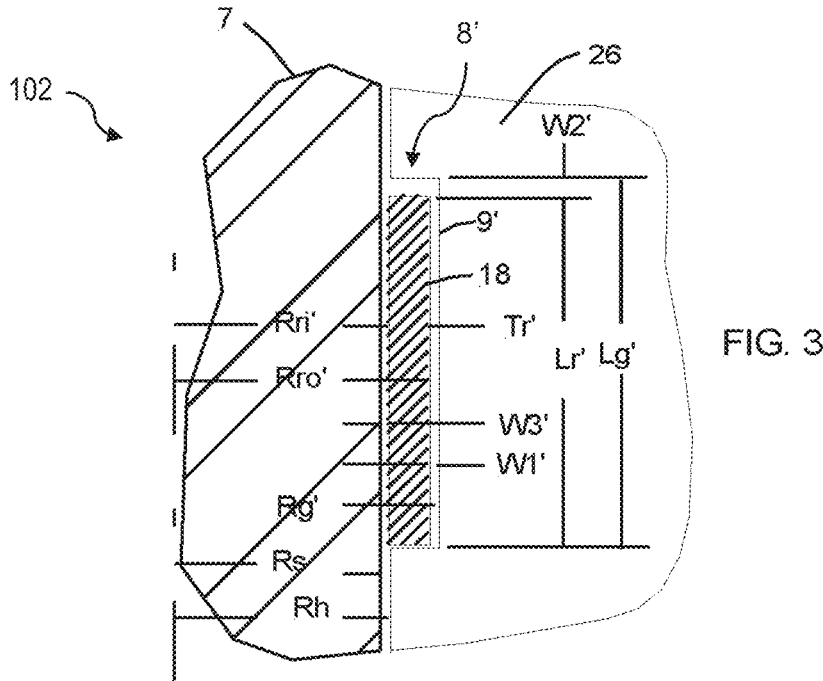
FIG. 3 is a cross section view of the area of the drive stem seal of the disclosed invention at the base of the warm end of the housing.

With reference to FIG. 3, shown is a cross section view of the area 102 of the drive stem seal of the disclosed invention at the base of the warm end of the housing. The seal structure 8' shown in FIG. 3 may be used for the GM cryogenic refrigerator 100 to improve sealing characteristics of the drive stem 7. The drive stem seal 8' of the disclosed invention as shown in FIG. 3 is similar to the displacer seal. The gas sealing pressure acts between the outside of seal ring 18 having radius Rro' and the inside of groove 9' in housing 26 and having radius Rg', a distance W1', and designated as gap W1'. Gap W2' is the difference between the length of seal ring 18, Lr', and the distance between the top and bottom of groove 9', Lg', and designated as gap W2'. The gap between the inside of seal ring 18 and the outside of drive stem 7 has a width W3' and is referred to as gap W3'. Gap W3' is always referred to here when there is no pressure difference across the ring. Drive stem 7 has a radius Rs and the bore in housing 26 has a radius Rh.

Figure 4:
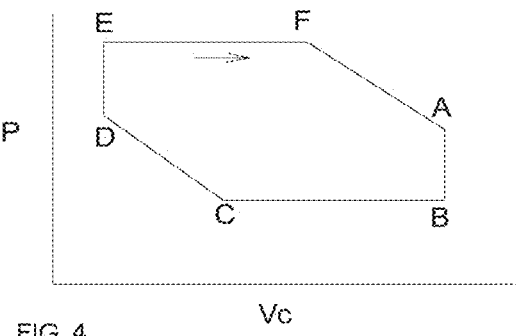
FIG. 4 shows a pressure-volume, P-V, diagram for the cold displaced volume.
Figure 5:
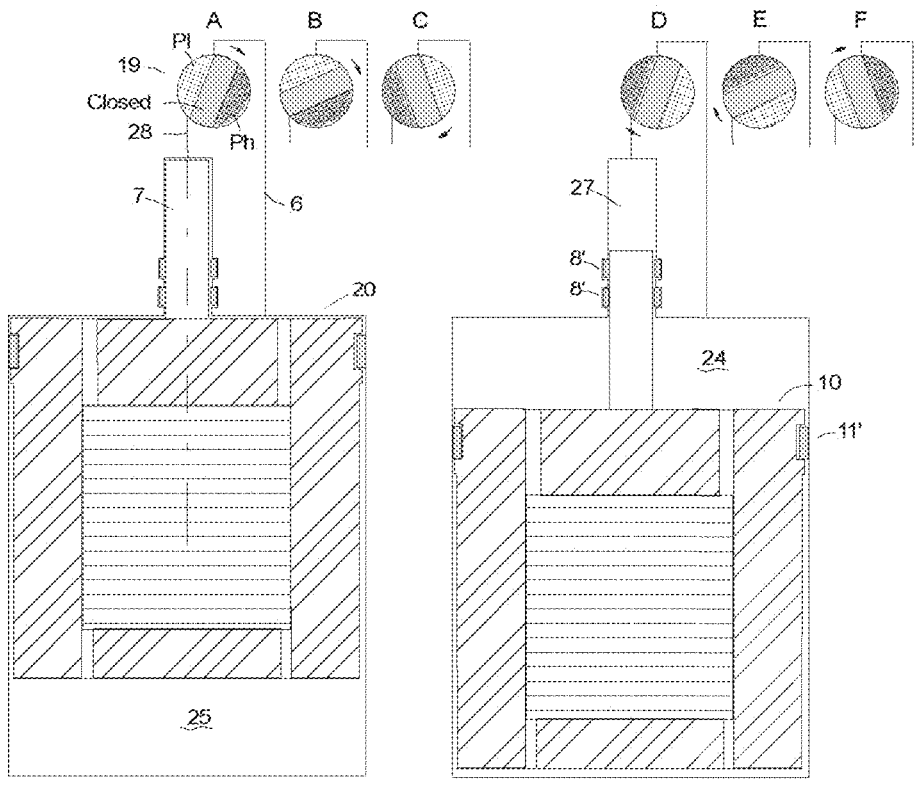
FIG. 5 shows a schematic of the position of the displacer and a rotary valve for the transition points of the P-V diagram of FIG. 4.

With reference to FIG. 4, shown is a pressure-volume, P-V, diagram for the volume Vc of cold displaced volume 25, with transition points noted when inlet valve 2 and outlet valve 3 (see FIG. 1) open and close. Starting with cold displaced volume 25 at its maximum, outlet valve 3 opens at point A and closes at point C venting gas to Pl. Between points C and D both valves are closed. At point D cold displaced volume 25 is minimized. Inlet valve 2 opens at point D and closes at point F supplying gas at Ph. Between points F and A both valves are closed. This valve sequence is shown schematically in FIG. 5 which represents the valves as the points where lines 6 and 28 contact a rotating disc 19 that has gas at Pl on one side and gas at Ph on the other side with a period when both are closed. The valve transition points A-F in FIG. 5 represent points A-F depicted in FIG. 4. Warm displaced volume 24 is connected with the high and low pressure sides of compressor 1 through line 6, and valves 2 and 3. Valves 2 and 3 are represented by the point where line 6 contacts rotating disc 19. FIG. 5 shows a GM expander with a pneumatic drive. Displacer assembly 10 reciprocates as pressure in drive stem volume 27 cycles out of phase with pressure to the displacer. Drive stem displaced volume 7 is connected with the high and low pressure sides of compressor 1 through line 28, and valves 2' and 3' which are shown schematically as the point where line 28 contacts rotating disc 19.

During the period between points A and B gas pressure in the displacer assembly 10 drops to Pl and the pressure drop through the regenerator pushes displacer seal 11' to the top of the groove 12'. At point B gas at Ph is admitted to drive stem volume 27 and pushes displacer assembly 10 down; also forcing displacer seal 11' to stay at the top of the groove. At point C gas stops flowing through line 6 and the pressure increases as gas at Ph on drive stem 7 pushes displacer assembly 10 down, warming and increasing the pressure of the cold gas as it is transferred through the regenerator to the warm end. Between points D and E gas at Ph trapped in drive stem volume 27 helps to hold displacer assembly 10 down while pressure builds up in displacer assembly 10 to Ph. Pressure drop through the regenerator pushes displacer seal 11' to the bottom of the groove. At point E pressure in drive stem volume 27 vents to Pl and pulls displacer assembly 10 up; also forcing displacer seal 11' to stay in the bottom of the groove. At point F gas stops venting through line 6 and the pressure drops as gas at Pl in drive stem volume 27 stays at Pl, continuing to pull displacer assembly 10 up, while gas flows from warm displaced volume 24 through the regenerator to cold displaced volume 25.

With reference to FIG. 5, shown is a single displacer seal 11' and two stem seals 8'. Displacer seal 11' experiences a large change in pressure, between pressures Ph and Pl, while it is not moving at the warm and cold ends, but only a small pressure difference while it is moving between the warm and cold ends. The seal or seals on the drive stem experience a large pressure difference most of the time. Therefore, having two seals rather than a single longer one has the advantage of having gas at an intermediate pressure, Pi, trapped between the two seals. As the pressure in displacer assembly 10 changes between points A and B, and D and E, one of the two drive stem seals will shift in its groove to the side where it will be held by friction forces as it moves. The other will shift as it starts to move. This will further reduce leakage past the seals.

With reference to FIGS. 6(A)-6(C), shown are section drawings of a seal ring that show a step cut. FIG. 6(A) shows a cross-sectional view of the seal ring viewed from the top, FIG. 6(B) is a cross-sectional view cut along M1-M1', and FIG. 6(C) is a cross-sectional view cut along N1-N1'. With reference to FIGS. 7(A)-7(C), shown is a composite ring that has a thin ring inside an outer ring. Both rings have cuts in them. FIG. 7(A) show a cross-sectional view of the seal ring viewed from the top, FIG. 7(B) is a cross-sectional view from direction V1, and FIG. 7(C) is a cross-sectional view cut along N2-N2'. Seal rings that are not cut can be made with a gap, W3 or W3', that is less than 30 μm and a material such as a filled Teflon that has a coefficient of elasticity of about 400 MPa. An example of a displacer seal in a cylinder having a radius Rc of 50 mm is one having a radius Rro of 49.99 (W3=10 μm), a radius Rri of 48 mm, and a length Lr of 11 mm. For a pressure difference across the seal while it is moving up and down of 0.05 MPa, an average of 0.025 MPa because of the pressure gradient, the pressure difference expands the ring so it seals in contact with the cylinder wall until the ring has worn to an Rro of 49.96 mm (W3=40 μm) when there is no pressure difference across it. The drag force due to friction drops as the ring wears.

Seal ring 30 shown in FIGS. 6(A)-6(C) is for a displacer. The step cut 31 reduces the leakage through the cut relative to a straight cut. One or more grooves 32 on seal ring 30 can increase the flow resistance past the seal. The initial radius Rro of the ring can be in the range of 20 μm less than radius Rc to about 2% more than radius Rro. The width of cut 31 in an oversized ring has to be at least π*2*(Rro–Rc) for it to fit when the displacer is installed in the cylinder. For a Teflon based cut ring the effective coefficient of elasticity relative to an uncut ring is about 10 MPa. For a displacer seal ring in a cylinder having a radius Rc of 50 mm, a radius Rro of 50.08 mm, a radius Rri of 48.1 mm, and length Lr of 11 mm the force needed to squeeze the ring into the cylinder adds about 10% to the force due a pressure difference of 0.05 MPa across the seal. The width of cut 31 has to be more than 0.5 mm for the ring to fit in the cylinder when it is installed in the cylinder and should be more than 1.0 mm to allow gap W3 to increase to about 80 μm (with no pressure difference) as it wears.

Leakage through cut 31 in seal ring 30 can be reduced by placing a thin backing ring 33 behind it as shown in FIGS. 7(A)-7(C). Backing ring 33 has cut 34 which is offset from cut 31 when the ring is installed. Backing ring 33 can be made of a material such as metal or plastic and is flexible enough to expand more than seal ring 30 for a given pressure difference. It is also shorter than length Lr. This composite ring is identified as displacer ring 40.

With reference to FIGS. 8(A)-8(C), shown is a composite ring 41 that has a thin ring inside an outer ring. The inner ring has a rib on the outside that separates and centers the two outer rings. All of the rings have cuts in them. FIG. 8(A) shows a cross-sectional view of the seal ring viewed from the top, FIG. 8(B) is a cross-sectional view from direction V2, and FIG. 8(C) is a cross-sectional view cut along N3-N3'. Composite seal ring 41 has extended the horizontal cut in seal ring 30 around the ring leaving two rings, 35, with grooves 32'. Thin backing ring 36 has a rib 37 that separates outer rings 35. Backing ring 36 is shorter than length Lr, and the purpose of rib 37 is to center the backing ring in the composite seal ring 41 so the backing ring does not touch the top and bottom of groove 12'. Cuts 31' and 38 in rings 35 and 36 respectively are offset when the rings are assembled in the cylinder.

With reference to FIGS. 9(A)-9(C), shown is a composite stem seal ring 50 that is designed to fit in a fixed groove in the housing to seal the outside of the drive stem. It is analogous to the ring shown in FIGS. 8(A)-8(C) except that the ring seals on the inside and the thin backing ring is on the outside. FIG. 9(A) shows a cross-sectional view of the seal ring viewed from the top, FIG. 9(B) is a cross-sectional view cut along M2-M2', and FIG. 9(C) is a cross-sectional view cut along N4-N4'. Composite stem seal ring 50 is designed to fit in a fixed groove in the housing to seal the outside of drive stem 7. It is analogous to composite seal ring 41 shown in FIGS. 8(A)-8(C) except that the ring seals on the inside and the thin backing ring is on the outside. Composite stem seal ring 50 is comprised of two seal rings 45 with grooves 42 and cuts 44, backing ring 48 with rib 47 and cut 49. Two seal rings 50 can be used as gas energized seals 8' for drive stem 7 of a pneumatically driven displacer as shown in FIG. 5. They are mounted in the housing where the pressure force across the seals is in the same direction as the pressure force when the displacer is driven up or down.

Figure 10:
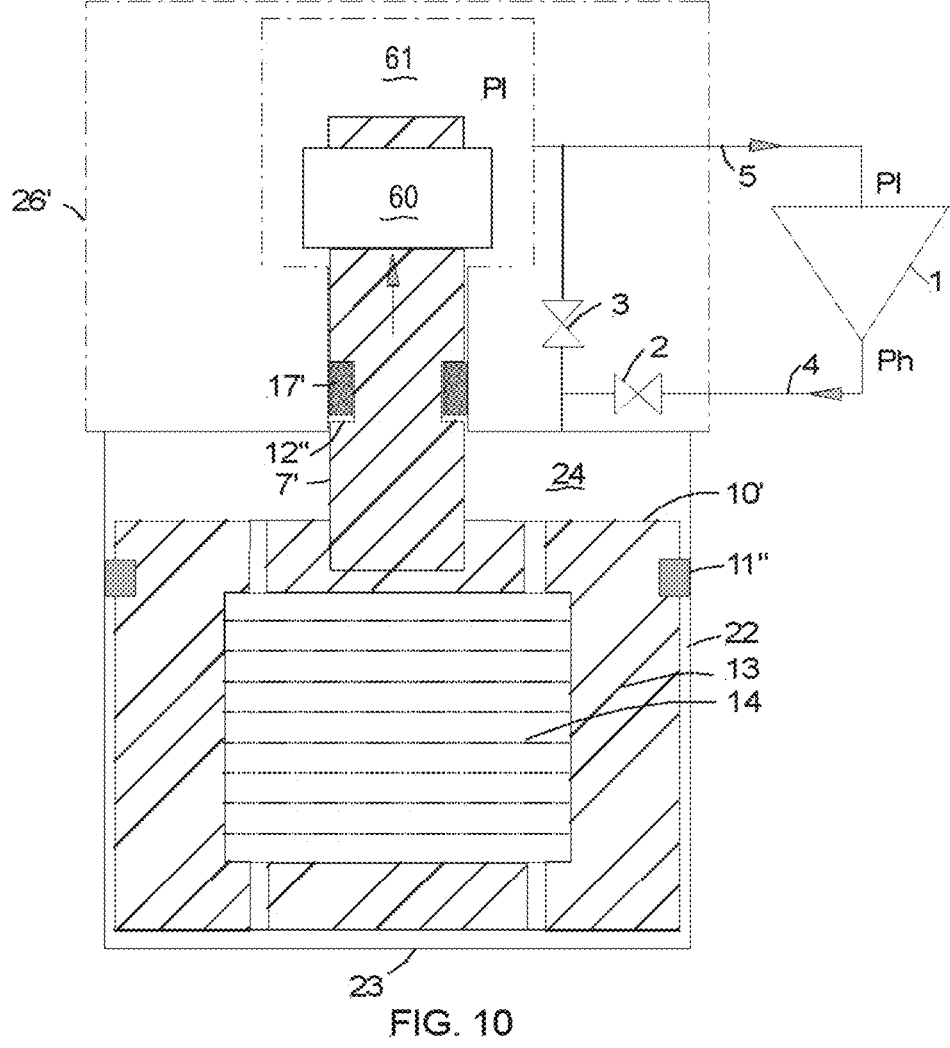
FIG. 10 is a schematic of the basic components of a GM cryogenic refrigerator which has a Scotch Yoke mechanism driving the reciprocating displacer. The seal on the drive stem is used to illustrate that a gas energized seal of the present invention can be designed to function when the friction force opposes the pressure force.

With reference to FIG. 10, shown is displacer assembly 10' with stem 7', driven by Scotch Yoke mechanism 60. Details of mechanism 60 and valves 2 and 3 are described in U.S. Pat. No. 5,361,588. The space 61 around the drive mechanism and stem in housing 26' is typically at low pressure, as shown, but may be at high pressure. The fact that the pressure above the stem seal is constant and the pressure below the seal cycles between Ph and Pl means that the pressure force across the seal and the friction force are in the same direction for the displacer moving in one direction, but not the other. This is true for the seal being in the housing or on the stem. One solution is to place one of two seals in the housing and the other on the stem, (not shown). The other solution is to place one seal as shown in FIG. 10 on the stem, but this only works if the design satisfies more constraints than seals described for the displacer as shown in FIGS. 6, 7, and 8. The seal ring 17' and groove 12' have the same structure as shown in FIG. 2 for the seal on the displacer. The constraint is that the axial pressure difference across the seal, dPa, times the cross sectional area of the seal (Ac) is greater than the average radial pressure of the seal against the wall times the area of the seal in contact with the wall (Ar) times the coefficient of friction. This means that the thickness of the seal (Tr) in FIG. 2, has to be large enough for the pressure difference dPa to keep the seal in contact with the end of the groove at the lower pressure while the force due to friction is trying to unseat it.

The disclosed invention further provides methods for sealing the displacer in a GM expander. The method includes steps of (i) when the cold displaced volume is minimal, shifting the ring to the lower side of the groove by admitting gas at high pressure to the warm displaced volume and flowing gas through W2 to increase the pressure in W1 to high pressure; (ii) moving the displacer to minimize the warm displaced volume, stopping the flow of gas at high pressure before the warm displaced volume is minimized; (iii) shifting the seal ring to the upper side of the groove by venting gas to low pressure from the warm displaced volume and flowing gas from the first gap (W1) through the second gap (W2) to decrease the pressure in the first gap (W1) to low pressure; and (iv) moving the displacer to minimize the cold displaced volume, stopping the venting of gas at low pressure before the cold displaced volume is minimized.

The disclosed invention further provides methods for sealing the drive stem of a GM expander. The method includes steps of (i) when the drive stem volume is maximal, shifting the seal ring to the upper side of the groove by admitting gas at high pressure to the warm displaced volume and removing gas at low pressure from the drive stem volume, flowing gas through the axial gap (W2') to increase the pressure in the radial gap (W1') to high pressure; (ii) moving the drive stem to minimize the warm displaced volume, stopping the flow of gas at high pressure before the warm displaced volume is minimized; (iii) shifting the ring to the lower side of the groove by venting gas to low pressure from the warm displaced volume and admitting gas at high pressure to the drive stem volume, flowing gas from the radial gap (W1') through the axial gap (W2') to decrease the pressure in the radial gap (W1') to low pressure; and (iv) moving the drive stem to maximize the drive stem volume, stopping the venting of gas at low pressure before the drive stem volume is maximized.

The terms and descriptions used herein are set forth by way of illustration only and are not meant as limitations. Those skilled in the art will recognize that many variations are possible within the spirit and scope of the invention and the embodiments described herein.

What is claimed is:

1. A Gifford-McMahon (GM) expander with improved seal characteristics, the GM expander comprising:
   a displacer having a groove on the outer circumference (Rd), wherein the groove is defined by an upper surface, a lower surface and a side surface connecting said upper and lower surfaces;
   a cylinder having an inner surface (Rc), wherein said displacer axially reciprocates in the cylinder;
   a seal ring placed in said groove, wherein the seal ring has an axial length along an axial direction of the displacer;
   a cold displaced volume in the cylinder at a lower end of said displacer;
   a warm displaced volume in the cylinder at an upper end of said displacer; and
   a regenerator between said cold and warm displaced volumes;

wherein said seal ring has an outer surface (Rro) adjacent to said cylinder and an inner surface (Rri) adjacent to said side surface of the groove, and wherein a first radial gap (W1) is formed between said inner surface of the seal ring and said side surface of the groove and a second axial gap (W2) is formed by a difference between the axial length of said seal ring (Lr) and a distance between said upper and lower surfaces (Lg) of the groove, wherein the second axial gap (W2) is greater than the first radial gap (W1).

2. The GM expander in accordance with claim 1, wherein the seal ring is configured such that force due to pressure drop across the seal ring and force due to friction of the seal ring sliding in the cylinder and stem are in the same direction while the displacer and stem are moving.

3. The GM expander in accordance with claim 1, wherein the seal ring has a cut between upper and lower surfaces.

4. The GM expander in accordance with claim 3, wherein the cut is one of a crescent cut, a straight cut, a diagonal cut, and a step cut.

5. The GM expander in accordance with claim 1, wherein the seal ring includes a Teflon based outer ring having a cut between upper and lower surfaces and a thinner inner ring which has a cut between upper and lower surfaces, the inner ring being more flexible than the outer ring.

6. The GM expander in accordance with claim 1, wherein the seal ring includes two Teflon based outer rings having cuts between the upper and lower surfaces and a thinner inner ring that has a rib that separates the two outer rings and has a single cut between the upper and lower surfaces, the inner ring being more flexible than the outer rings.

7. The GM expander in accordance with claim 1, wherein a third radial gap (W3) is formed between the inner surface of the cylinder (Rc) and the radius of said ring (Rro) before installation, wherein the third radial gap (W3) is less than 30 μm.

8. The GM expander in accordance with claim 7, wherein the product of said third radial gap (W3) and the thickness (Tr) of said ring, W3*Tr, is less than the product of said second axial gap and the length of said ring, W2*Lr.

9. The GM expander in accordance with claim 1, wherein the outer radius of said seal ring (Rro) before installation is greater than the radius of said cylinder (Rc).

10. The GM expander in accordance with claim 1, wherein at least one groove is engraved on said outer surface circumferentially.

11. The GM expander in accordance with claim 1, wherein the elasticity of said seal ring is less than 400 MPa.

12. The GM expander in accordance with claim 1, wherein said groove is near the upper end of said displacer.

13. The GM expander in accordance with claim 1, wherein said seal ring is made of a Teflon based material.

* * * * *